(12) United States Patent
Marcus

(10) Patent No.: US 6,208,998 B1
(45) Date of Patent: Mar. 27, 2001

(54) ON-LINE DIRECTORY SERVICE THROUGH THE INTERNET

(75) Inventor: Kevin R. Marcus, Redmond, WA (US)

(73) Assignee: InfoSpace, Inc., Bellevue, WA (US)

( * ) Notice: Subject to any disclaimer, the term of this patent is extended or adjusted under 35 U.S.C. 154(b) by 0 days.

(21) Appl. No.: 09/207,390

(22) Filed: Dec. 8, 1998

(51) Int. Cl.[7] .................................................. G06F 17/30
(52) U.S. Cl. ............................ 707/104; 707/3; 707/10; 707/201
(58) Field of Search ............................... 707/3, 10, 104, 707/201

(56) References Cited

U.S. PATENT DOCUMENTS

| | | | |
|---|---|---|---|
| 5,745,895 | * 4/1998 | Bingham et al. | 707/10 |
| 5,761,649 | * 6/1998 | Hill | 705/27 |
| 5,765,030 | * 6/1998 | Nachenberg et al. | 714/33 |
| 5,774,887 | * 6/1998 | Wolff et al. | 707/1 |
| 5,813,006 | * 9/1998 | Polnerow et al. | 707/10 |
| 5,915,001 | * 6/1999 | Uppaluru | 379/88.22 |
| 6,016,504 | * 1/2000 | Arnold et al. | 709/200 |
| 6,041,324 | * 3/2000 | Earl et al. | 707/9 |

OTHER PUBLICATIONS

NYNE Launches Online Business Directory In U.S. Market, IDP Report, Feb. 21, 1992.*

* cited by examiner

Primary Examiner—Thomas Black
Assistant Examiner—Charles L. Rones
(74) Attorney, Agent, or Firm—Christensen O'Connor Johnson Kindness PLLC; Anthony B. Claiborne

(57) ABSTRACT

A method and system for altering content of a record in a database over Internet is provided. The method includes receiving a request generated over the Internet by a requester that requests records in the database. Searching the records for a requested record corresponding to the request and, upon finding the requested record, displaying the requested record content and an alter record indicator. The requester generating an alter record request over the Internet by selecting the alter record indicator and providing a verification address. If the alter record request contains the verification address, displaying a confirmation message to the requester. The confirmation message comprising a reply address and a reference code. The requester sending an alter record message containing the reference code to the reply address. After receipt of the alter record message at the reply address, determining whether the alter record message contains the reference code. If the alter record message contains the reference code, updating the requested record according to the alter record message.

7 Claims, 4 Drawing Sheets

ON-LINE DIRECTORY SERVICE THROUGH THE INTERNET

FIELD OF THE INVENTION

The present invention relates to on-line directory services, and more particularly to altering the content of a record in the on-line directory services.

BACKGROUND OF THE INVENTION

Various types of commercial on-line directory services are available for access by the general public. These services are generally structured to include both "yellow pages" information as well as "white pages" information. By accessing the directory service through the Internet via particular web pages, a user can typically enter information about a third party, including such items as first name, last name, address, etc. The user then selects a search, or go, type button to initiate the search. Once initiated, the on-line directory service provider performs a computer search of various databases to determine whether a match is available. If so, the information is then displayed to the user.

It often occurs that a person listed in the directory service becomes aware that information displayed in his or her listing is in error. To correct the error, the user needs some type of editing capability, or way to inform the directory service that the listing is wrong and the details of the correct information.

One on-line directory system, described in U.S. Pat. No. 5,742,769, provides a method in which a person can register with the directory service provider as an authorized user. Once the user has been registered, he or she may access a log-in option which allows the user to be authenticated as a registered user. Once logged in to the database system as a registered user, the user may update his or her informational record in the database via an update screen In this manner, registered users can change their own listing without intervention or action by the database system.

The '769 registration system for altering the information in a person's listing has a number of disadvantages. A first disadvantage is that it is cumbersome. The person must first register with the directory service, and then once registered the user must take additional time to be authenticated by the system. Once that is complete, the user is finally allowed the opportunity to describe the changes required to their listing. Most users would like more immediate action, or at least the ability to immediately send the directory service the desired changes before they are forgotten.

Thus, a need exists for an on-line directory service that has an improved system for allowing a person to update their listing information. The present invention is directed to fulfilling this need and others.

SUMMARY OF THE INVENTION

In accordance with aspects of the present invention, a method for altering content of a record in a database over Internet is provided. The method includes receiving a request generated over the Internet by a requester that requests records in the database. Searching the records for a requested record corresponding to the request and, upon finding the requested record, displaying the requested record content and an alter record indicator. The requester generating an alter record request over the Internet by selecting the alter record indicator and providing a verification address. If the alter record request contains the verification address, displaying a confirmation message to the requester. The confirmation message comprising a reply address and a reference code. The requester sending an alter record message containing the reference code to the reply address. After receipt of the alter record message at the reply address, determining whether the alter record message contains the reference code. If the alter record message contains the reference code, updating the requested record according to the alter record message.

In accordance with other aspects of this invention, the reference code includes a randomly generated number, the alter record indicator includes a button on a Web browser, the verification address includes an email address associated with the requester, the requested record content includes a name, an address, and a phone number, and the reply address includes an email address.

In accordance with further aspects of this invention, an on-line director service accessible over Internet is provided including a database of information including records and a processing system. The processing system receives a request generated over the Internet by a requester requesting records in the database, searches the records for a requested record corresponding to the request and, upon finding the requested record, displays the requested record content and an alter record indicator. The processing system further receives an alter record request generated by the requester over the Internet by selecting the alter record indicator and providing a verification address. If the alter record request includes the verification address, the processing system displays a confirmation message to the requester. The confirmation message includes a reply address and a reference code. If the processing system receives an alter record message containing the reference code, the processing system updates the requested record according to the alter record message.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
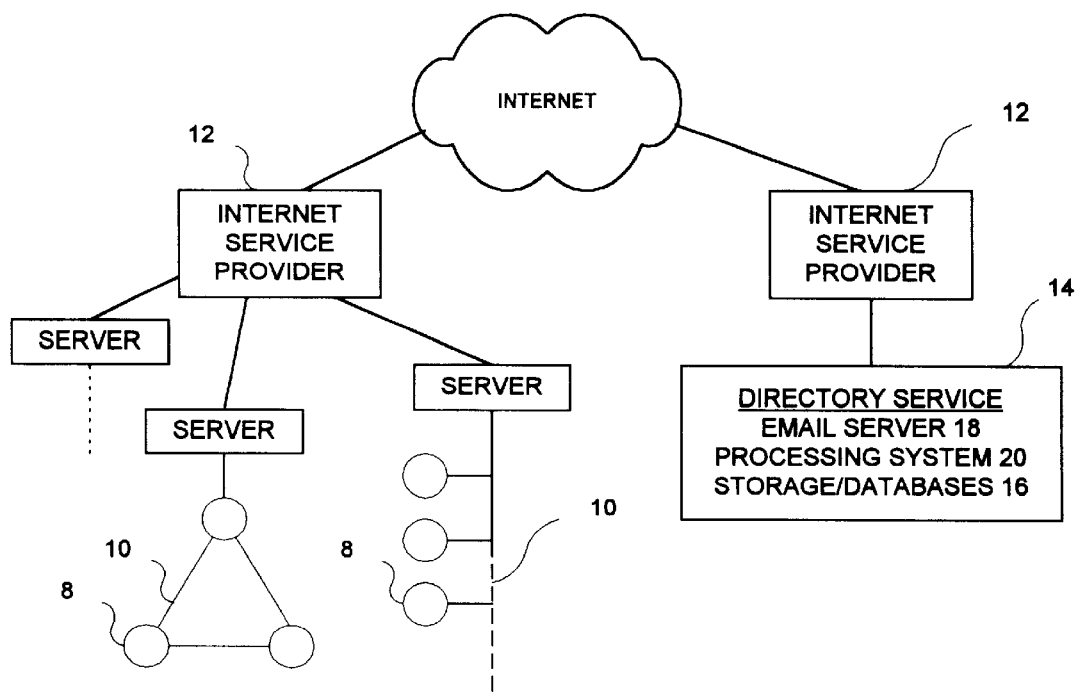
FIG. 1 is a block diagram of a directory service within a network.

Referring to FIG. 1, individual users 8 are interconnected through any number of different types of networks 10, including local area networks (LANs) or regional networks accessed over telephone lines, such as commercial information services. Each user 8 has access to the Internet via an Internet Service Provider 12 using any one of a number of commercially available browsers. Once connected to the Internet, a user 8 can access on-line directory services 14 that are typically located on the World Wide Web and are generally publicly accessible using a hypertext transfer protocol (HTTP). A user enters an HTTP request using the browser and receives back the requested web page of that particular on-line directory service provider.

The on-line directory service 14 electronically maintains a number of large databases (or more generically, electronic "storage") 16 that have listings, or records, for of its entrants. This directory service database is accessible over the Internet using the service's web site. Most directory service web sites are arranged in a format that includes both "White Pages" and "Yellow Pages". The records contain basic information such as first name, last name, address, etc. As stated in the background section, the database records are typically compiled from sources such as telephone records and published phone books.

Still referring to FIG. 1, the directory service 14 includes an email server 18 and a processing system 20. The processing system 20 has a number of computers, or gaters, each of which is linked to the storage either directly or through an intermediate switching network. A user accesses the directory service over the Internet and through a firewall that protects the service from external tampering.

Figure 2:
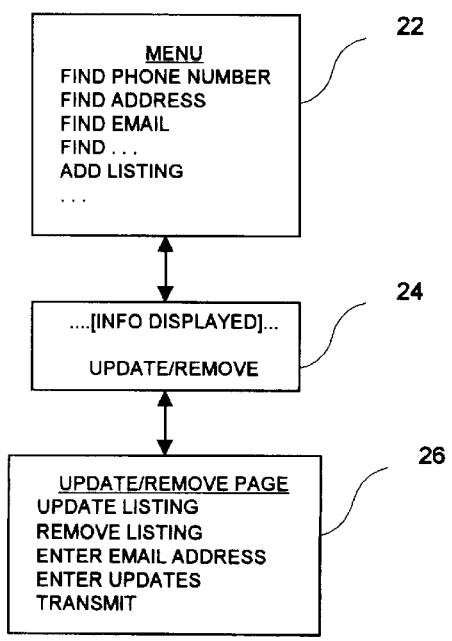
FIG. 2 is a chart of menus and input screens.

Referring to FIG. 2, when the user accesses the service through a standard URL identifier, the processing system 20 provides to the user a menu 22 that includes one or more request choices for finding various types of data available from that particular directory service. These choices are selected using a keyboard or pointing device, such as a mouse or trackball. Shown in FIG. 2 are the choices to "FIND PEOPLE", "FIND ADDRESS", "FIND EMAIL", etc. Upon selection of one of the choices, the processing system eventually determines whether a match exists and displays the matched items to the user in a display screen at item 24.

Figure 3:
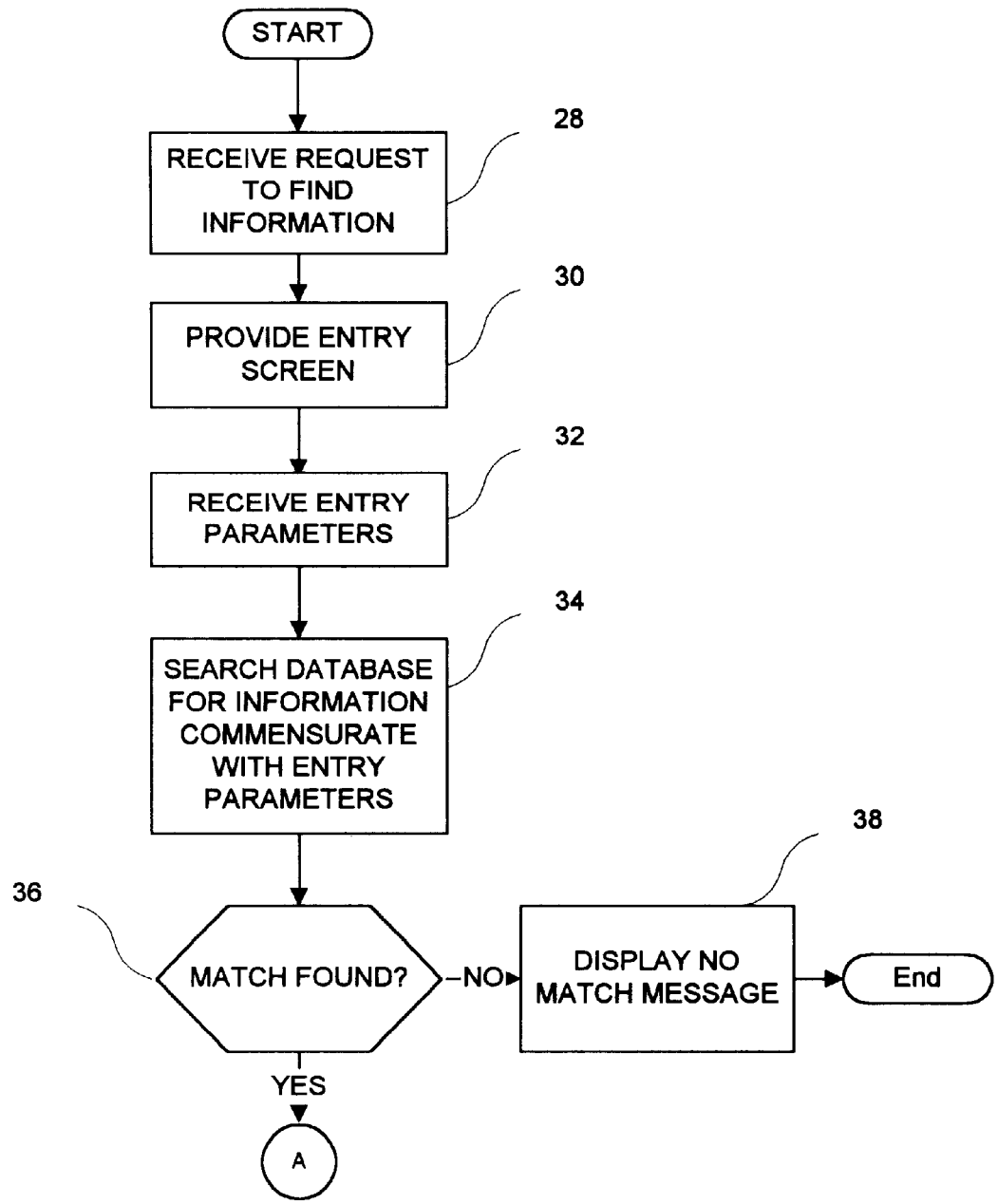
FIGS. 3, 4, and 5 are flow charts illustrating a method formed in accordance with the present invention of processing a user's request for changes to their listing.

The processing system accomplishes this as shown in FIG. 3. When the user selects the menu item to find a particular listing or other information, the processing system 20 receives the request at block 28 and in response provides at block 30 an entry screen with fields for the user to enter various types of data useful in searching for the correct listing. This may include such items as a name or address. The user enters this information and submits the parameters to the processing system using selection buttons on the web page. The system receives the entry parameters at block 32 and conducts a search of the database to find the record (or records) that match the entry parameters at block 34. If no match is found, a display message is provided back to the user at block 38.

If one or more matches are found, the processing provides at step 40 (see FIG. 4) the search results in the display screen 24. Also includes in the display screen is a selectable word or icon to allow the user to update or remove information for that matched listing. Shown in FIG. 2 as a representative example is the selectable text "UPDATE/REMOVE".

Upon selection of this text the user is provided with a data entry page 26 that includes various data entry boxes that enable the user to clearly indicate his or her desired change (or changes). Shown in FIG. 2, the main selections include "UPDATE LISTING", "REMOVE LISTING", "ENTER EMAIL ADDRESS", "ENTER UPDATES", and "TRANSMIT". The UPDATE LISTING and REMOVE LISTING are mutually exclusive selections. The ENTER EMAIL ADDRESS is a required entry. The ENTER UPDATES is preferably provided in the form of a list that shows each data types of information contained in the listing record and an entry block near the data type description. The current value of each data type is shown in the entry block. For example, the ENTER UPDATES listing may include an Address data type and an entry block near the Address label that shows the record's current information. After the user enters the desired record change in to the UPDATE/REMOVE page, the user selects TRANSMIT to send the request to the directory service.

Figure 4:
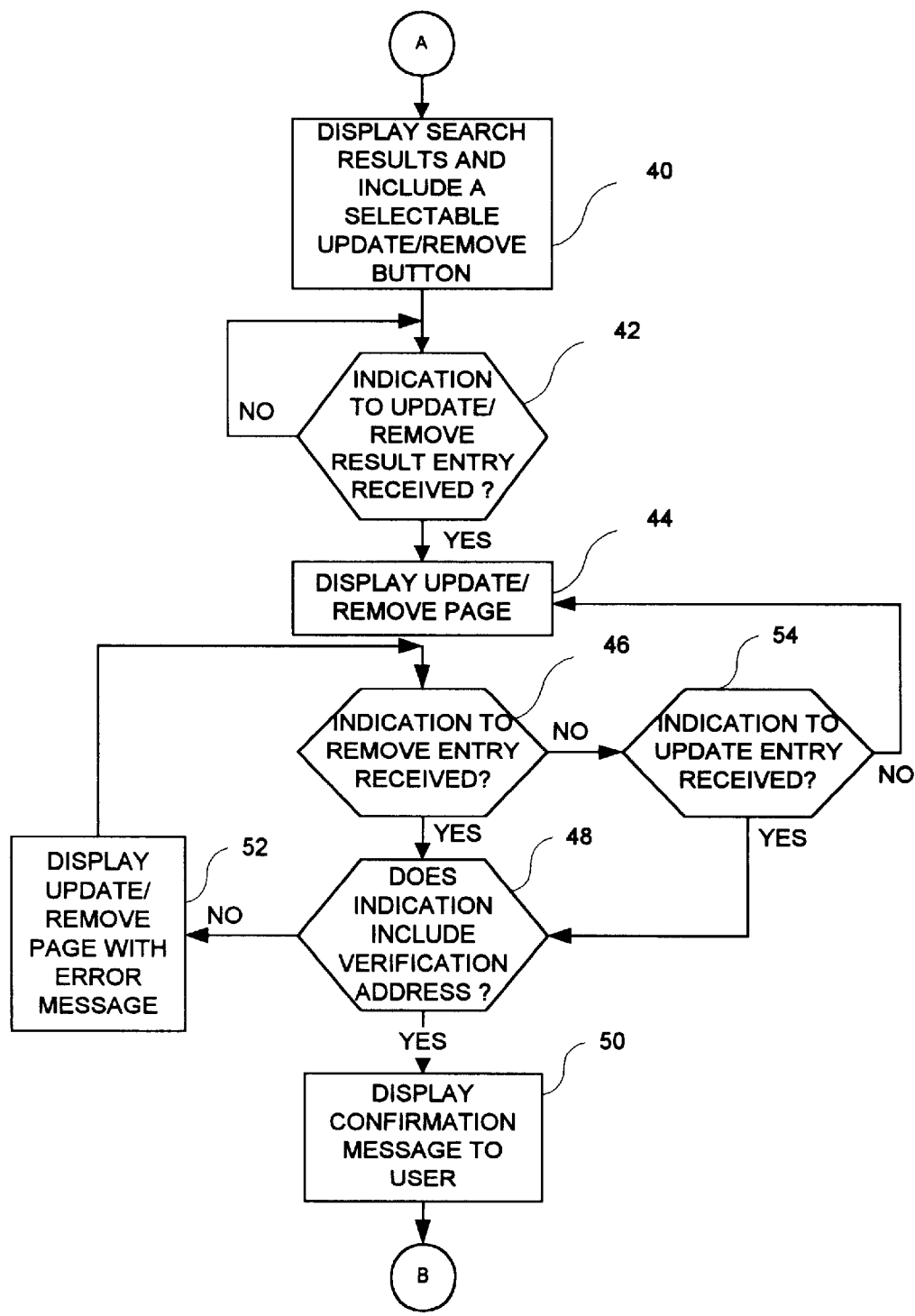

Referring to FIG. 4, the processing system 20 determines whether an indication to update or remove a listing is received at block 42. If so, the processing system 20 displays the UPDATE/REMOVE page at block 44. The processing system 20 then determines whether the user has transmitted a request to remove a listing at block 46. If so, the request is checked to make sure that the user included an email address for verification at block 48. If the user did not include the verification email address, the processing system 20 displays the initial UPDATE/REMOVE page with an error message indicating what the user did wrong and/or what the user must do in order for the request to be processed.

The processing system 20 further checks whether the user has transmitted a request to update a listing at block 54. If no change requests are received, the system continues to display the UPDATE/REMOVE page. If a request to update a listing is received from block 54, the request is checked at block 48 to make sure that the user has included a verification email address. The processing system further performs data conformity testing, such as checking that a telephone number is valid for the selected country, a zip code is valid for the selected country, any other required fields are provided, etc. If the user did not includes the verification email address, or if other required fields are not provided, or if the data does not conform as expected, then the processing system 20 displays the initial UPDATE/REMOVE page with an error message indicating what the user did wrong and/or what the user must do in order for the request to be processed.

Once a request is received that includes the verification email address and any other required information and in conformed, the processing system saves the changes, generates a random Reference Code associated with the saved changes, and displays to the user a confirmation message indicating that the request was received and is being processed. In addition, it is preferable to include in the confirmation message information about the email message that will be sent to the user and the action thereafter required by the user in order for the request to actually be entered. Numerous variations in the types of messages are possible.

Figure 5:
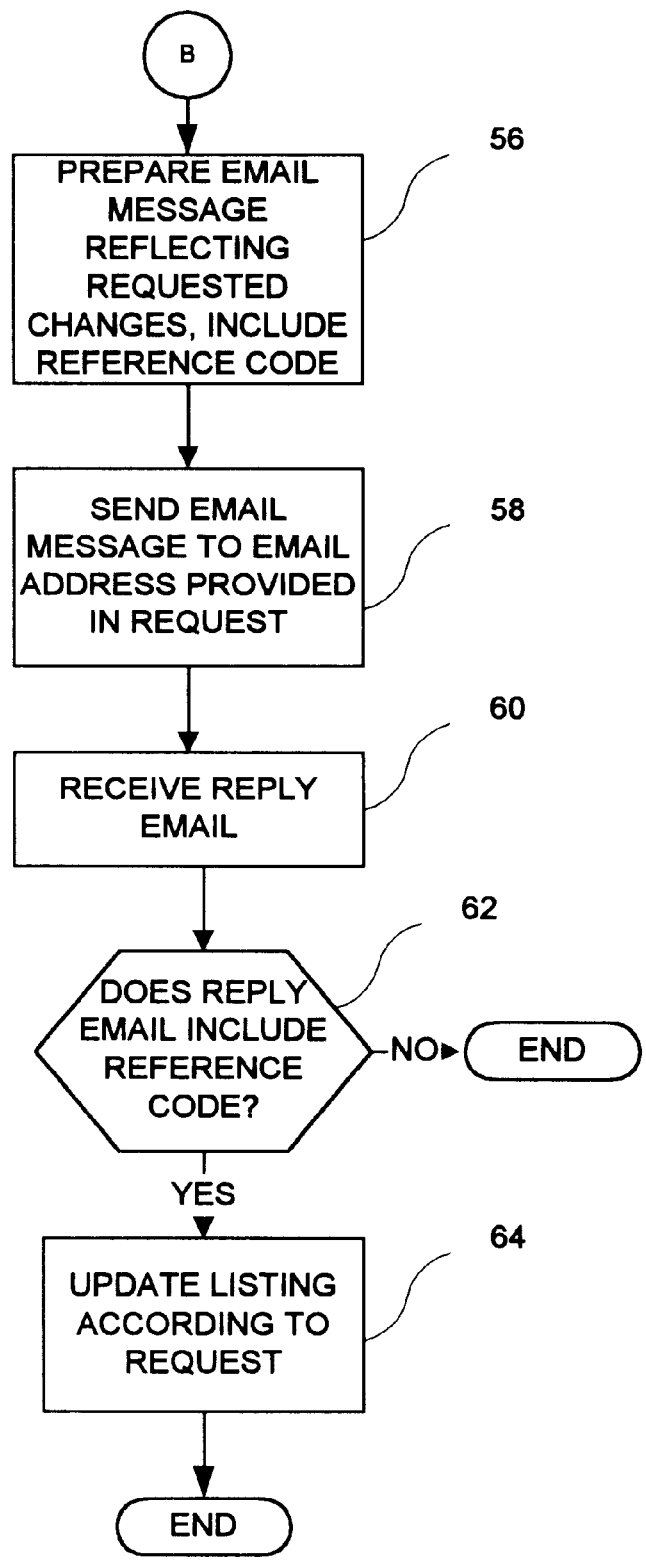

Referring to FIG. 5, the processing system 20 prepares an email message at block 56 using the information in the person's change request. In one embodiment, the email message includes a listing of the old information, a listing of the new requested change, the randomly generated Reference Code, and a message instructing the user as to the action required in order for the request to actually be entered. In preferred embodiments, this action includes requiring the person to eventually send a reply email to the directory service that includes the Reference Code. This Reference Code is used by the processing system as a means to locate the changes as originally submitted by the user in the web page modification request.

The processing system sends at block 58 the prepared email message to the requester using the verification email address provided in the request. After the user replies to the prepared email message as instructed, the processing system receives the reply at block 60 and checks for the Reference Code at block 62. If the Reference Code is not included, then the processing system ignores the email. In an alternative embodiment, the processing system sends a reply email message to the sender indicating why the email return request will not be processed.

If the correct Reference Code is provided, the processing system updates the listing according to the request at block 64. During this step, the processing system first determines the set of changes associated with Reference Code, i.e., the changes submitted by the user in the web page modification request. If the Reference Code does not correspond to an actual stored request, the processing system ignores the return email request (or alternatively sends a reply email message to the sender indicating why the email return request will not be processed.) If the Reference Code does correspond to an actual stored request, the processing system updates the listing accordingly. In performing "modifications" of the listing, preferred embodiments actually delete the listing entirely and add a new listing.

In an alternative embodiment, the user is further provided at menu 22 with the ability to add a new listing to the directory service database. Upon selection of an "ADD LISTING" field, the processing system provides a data entry page similar to the one used for modifications (except that the fields are empty and do not default to any values). After the user enters the new listing data and hits the transmit button, the processing system checks to ensure that all entries into each field are reasonable, e.g., to ensure that telephone numbers include only numbers, etc. If entries are OK, then a confirmation message is sent to the user. If the entries have errors, then the data entry page is redisplayed with an indication of the error. The remaining logic processed as shown in FIG. 5.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An on-line directory service accessible over Internet, the on-line directory service comprising:
   (a) a database of information, the database comprising records;
   (b) a processing system that receives a request generated over the Internet by a requester requesting records in the database, searches the records for a requested record corresponding to the request; upon finding the requested record, displays the requested record content and an alter record indicator,
   (c) the processing system further receives an alter record request generated by the requester over the Internet by selecting the alter record indicator and providing a verification address; upon determining that the alter record request includes the verification address, displays a confirmation message to the requester, the confirmation message comprising a reply address and a reference code; receives an alter record message sent by the requester to the reply address, the alter record message containing the reference code; upon determining that the alter record message contains the reference code, updates the requested record according to the alter record message.

2. A method for altering content of a record in a database over Internet, the method comprising:
   (a) receiving a request for records in the database, the request generated over the Internet by a requester;
   (b) searching the records for a requested record corresponding to the request;
   (c) if the requested record is found,
      (1) displaying the requested record content and an alter record indicator,
      (2) generating an alter record request over the Internet by selecting the alter record indicator and providing a verification address;
      (3) if the alter record request includes the verification address, displaying a confirmation message to the requester, the confirmation message comprising a reply address and a reference code;
      (4) sending an alter record message to the reply address, the alter record message including the reference code;
      (5) after receipt of the alter record message at the reply address, determining whether the alter record message includes the reference code; and
      (6) if the alter record message includes the reference code, updating the requested record according to the alter record message.

3. The method according to claim 1, wherein the reference code includes a randomly generated number.

4. The method according to claim 1, wherein the alter record indicator includes a button on a Web browser.

5. The method according to claim 1, wherein the verification address includes an email address associated with the requester.

6. The method according to claim 1, wherein the requested record content includes a name, an address, and a phone number.

7. The method according to claim 1, wherein the reply address includes an email address.

* * * * *

UNITED STATES PATENT AND TRADEMARK OFFICE
CERTIFICATE OF CORRECTION

| | | |
|---|---|---|
| PATENT NO. | : 6,208,998 B1 | Page 1 of 1 |
| DATED | : March 27, 2001 | |
| INVENTOR(S) | : K.R. Marcus | |

It is certified that error appears in the above-identified patent and that said Letters Patent is hereby corrected as shown below:

Title page,
column 1,
Item (54), "ON-LINE DIRECTORY SERVICE THROUGH THE INTERNET" should read -- ON-LINE DIRECTORY SERVICE --

Column 1,
Line 1-2, "ON-LINE DIRECTORY SERVICE THROUGH THE INTERNET" should read -- ON-LINE DIRECTORY SERVICE --

Column 6,
Line 18 (Claim 2, line 9), "indicator," should read -- indicator; --

Signed and Sealed this

Sixth Day of November, 2001

*Attest:*

NICHOLAS P. GODICI
*Attesting Officer*    Acting Director of the United States Patent and Trademark Office